Dec. 7, 1971  I. RUB  3,624,846

SPRING UNITS

Filed Feb. 25, 1970

INVENTOR
IGNACZ RUB

United States Patent Office 3,624,846
Patented Dec. 7, 1971

3,624,846
SPRING UNITS
Ignacz Rub, 38 Park Drive, Golders Green,
London, NW. 11, England
Filed Feb. 25, 1970, Ser. No. 14,175
Claims priority, application Great Britain, Feb. 26, 1969,
10,403/69
Int. Cl. A47c 23/04, 25/00
U.S. Cl. 5—259                                          5 Claims

ABSTRACT OF THE DISCLOSURE

A spring unit comprising a spring layer formed from one or more serpentine-shaped springs and a second spring layer formed from coiled springs which are connected to the serpentine-shaped springs.

---

The present invention relates to spring units for use in bedding, setees, chairs, hammocks, car seats, aeroplane seats, railway seats etc.

Helical spring units are well known in which a plurality of single-cone or double-cone shaped springs are mounted between two frames formed from steel strip or wire. Opposite ends of the springs are attached to the frames by means of clips.

In another known spring unit, zig-zag or serpentine-shaped springs are arranged in parallel fashion and attended at opposite ends to a frame.

A disadvantage of bedding, setees etc., made from all the above-mentioned spring units is that they are not very comfortable. Also the springs tend to cut through the material covering the spring unit, e.g. foam rubber, thus considerably reducing the useful life of the bedding etc.

Double-spring units are known in which a helical unit has helical springs mounted at one end thereof on a frame and attached at the other end thereof a wire mesh. A plurality of further helical springs are mounted at one end thereof on the other side of the mesh and are attached at the other end thereof to a second wire mesh. The resulting spring unit, having a double layer of spring compared with a single-spring unit, is extremely comfortable and long lasting. The main disadvantage of such a double-spring unit is its high cost, since the mounting of two layers of double springs is complicated, time-consuming and requires very skilled labour. A further disadvantage of such a double-spring unit is the large amount of space occupied by the double depth of springs, which frequently renders furniture having such a double-spring unit cubmersome and too large for general use.

An object of the present invention is to provide a spring unit combining the advantages of known double-spring units with the simplicity of single spring units.

A further object of the present invention is to provide such a spring unit which takes up less space than a corresponding double-spring unit.

The invention provides a spring unit comprising a first spring layer formed from a serpentine-shaped spring and a second spring layer formed from coiled springs connected thereto.

The coiled springs may be single-cone or double-cone shaped.

Preferably, there are a plurality of serpentine springs arranged parallel to each other.

Preferably, when the coiled spring is single cone-shaped, the smaller-diameter end is connected to a C-shaped clip by means of a rivet, the C-shaped clip engaging adjacent transverse portions of the serpentine spring.

Figure 1:
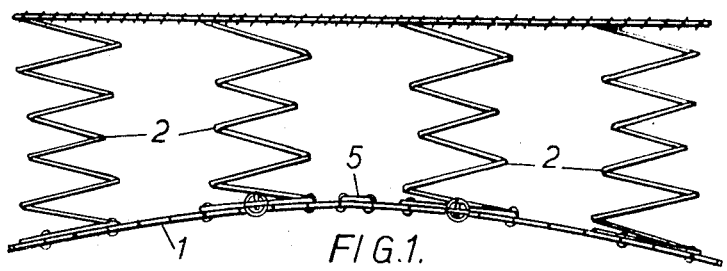
Figure 2:
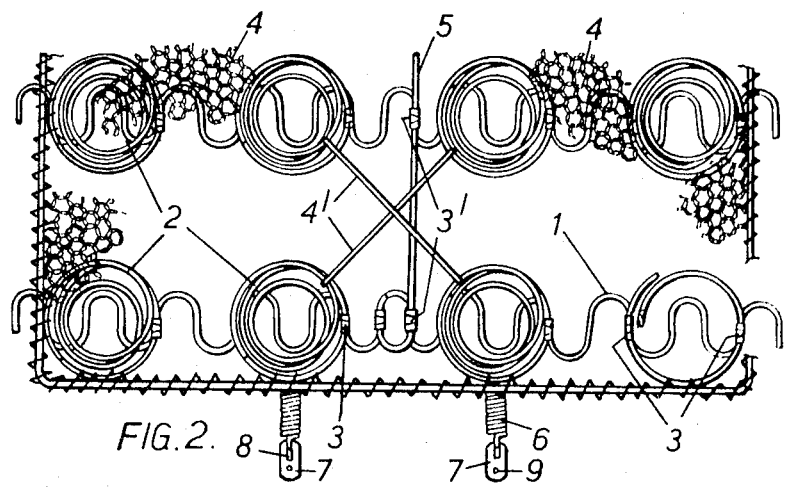
Figure 3:
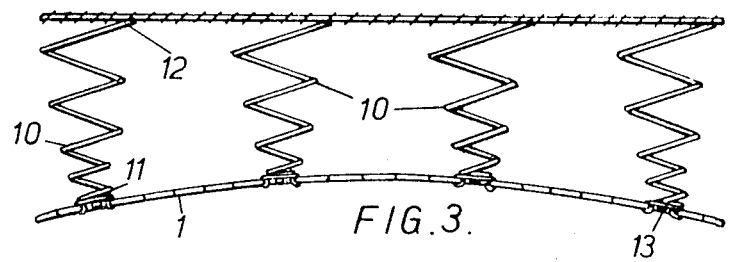
Figure 4:
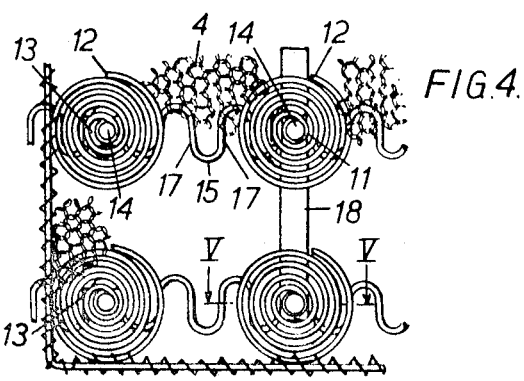
Figure 5:
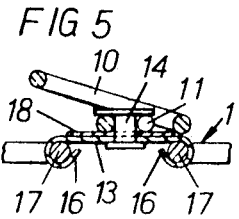

The invention will be further described with reference to two embodiments shown by way of example in the accompanying drawing, wherein:

FIG. 1 is a side view of a spring unit,
FIG. 2 is a plan view of the spring unit of FIG. 1,
FIG. 3 is a side view of a second embodiment of a spring unit,
FIG. 4 is a plan view of the spring unit of FIG. 3, and
FIG. 5 is a detailed section taken along the line V—V of FIG. 4.

In FIGS. 1 and 2 a spring unit comprises a first, lower spring layer formed from serpentine-shaped or zig-zag springs 1, and a second, upper spring layer formed from coiled springs 2. The coiled springs 2 are double-cone shaped and are connected at one end to the serpentine springs 1 by butterfly clips 3 or any other suitable fastening means. The other end of the coiled springs 2 are engaged in, and held in place by, a metal mesh 4. Alternatively, the other end of the coil springs 2 are held in place by connecting links 4' to form a clipped top platform.

To provide even springing action one or more tie bars 5 are provided which extend across the serpentine-shaped springs 1 and are connected thereto by butterfly clips 3'.

The spring unit is mounted in a frame of an article being sprung by fastening the ends of the serpentine springs to the frame. In order to provide a stiffer springing action, the outermost serpentine-shaped springs (only one is shown in FIG. 2) are connected along their length to the frame by means of tension springs 6 and plates 7.

Each plate 7 has an elongated aperture 8, which is removably engaged by an end of the tension spring 6, and an aperture 9 for fastening the plate to the frame by means of a nail, screw or the like.

In the second embodiment of FIGS. 3 to 5, the second, upper spring layer is formed from coil springs 10 which are single-cone shaped, i.e. they each have an end 11 having a smaller diameter than the other end 12. The ends 12 of the springs 10 are, as in FIGS. 1 and 2, engaged in, and held in place by, a metal mesh 4. The end 11 of each spring 10 is fastened to a C-shaped clip 13 by means of a rivet 14. Each C-shaped clip is attached to a serpentine-shaped spring 1 by sliding the clip over a curved portion 15 of the spring 1 so that arms 16 of the clip 13 engage adjacent transverse portions 17 of the spring 1. This is an extremely simple way of connecting the springs 10 to the springs 1.

In order to provide even springing, a metal strip 18 extends transverse of the springs 1 and is connected thereto by means of the rivets 14.

Various modifications may be made within the scope of the invention as defined by the appended claims.

I claim:
1. A spring unit comprising a first spring layer formed from at least one serpentine-shaped spring; a second spring layer formed from a plurality of single-cone shaped coiled springs, the smaller-diameter end of each of said single-cone shaped springs being riveted to a C-shaped clip, said C-shaped clip being attached to said transverse sections of said at least one said serpentine-shaped spring, and comprising a planar section through which said rivet is attached, and curved end sections attached to said transverse serpentine-shaped spring sections.

2. A spring unit as claimed in claim 1 comprising a plurality of serpentine-shaped springs extending parallel to each other and link means connecting adjacent serpentine-shaped springs.

3. A spring unit as claimed in claim 2 comprising a frame, tension springs connected to the outermost serpentine-shaped springs, and link means connecting said tension springs to said frame.

4. A spring unit as claimed in claim 3 wherein the link means comprise plates, means in each plate defining an elongated hole therein removably engaged by the end of a tension spring.

5. A spring unit as claimed in claim 1 comprising clip means interconnecting ends of said coil springs remote from said at least one serpentine-shaped spring to form a clipped top platform.

References Cited

UNITED STATES PATENTS

| | | | |
|---|---|---|---|
| 871,244 | 11/1907 | Smith et al. | 5—259 |
| 1,372,702 | 3/1921 | Kruezkamp | 5—259 B |
| 2,293,563 | 8/1942 | Ruggles | 267—88 |
| 2,332,041 | 10/1943 | Asaro | 267—88 |
| 2,680,253 | 6/1954 | Gleason | 5—259 X |
| 2,156,728 | 5/1939 | Krakauer | 5—259 |
| 3,087,171 | 4/1963 | Hoagland et al. | 5—354 |
| 3,199,163 | 8/1965 | Surletta | 5—260 X |
| 3,324,485 | 6/1967 | Haney et al. | 5—260 |

CASMIR A. NUNBERG, Primary Examiner

U.S. Cl. X.R.

5—263, 254; 267—88